April 27, 1965   M. BENTELE   3,180,562
SEALS FOR ROTARY MECHANISMS
Filed Oct. 29, 1962   4 Sheets-Sheet 2
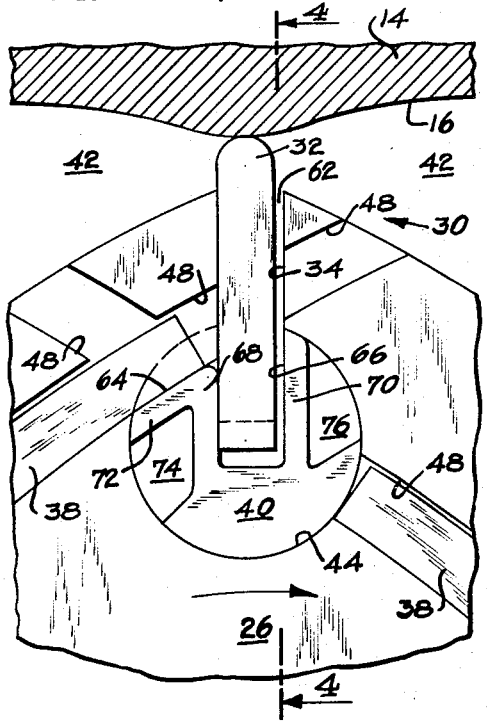
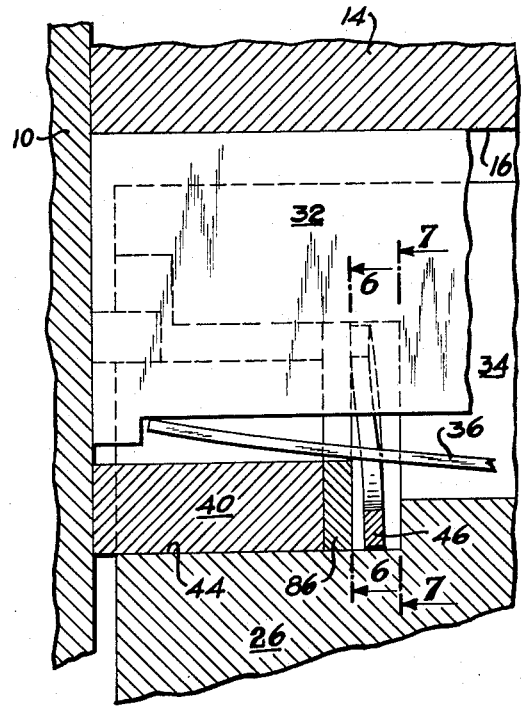
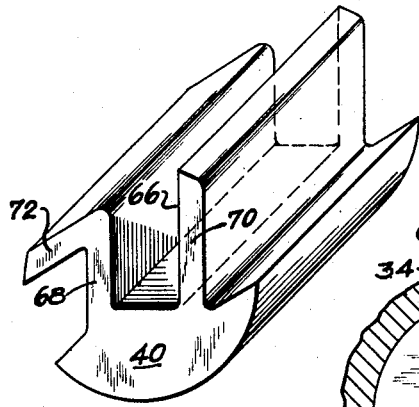
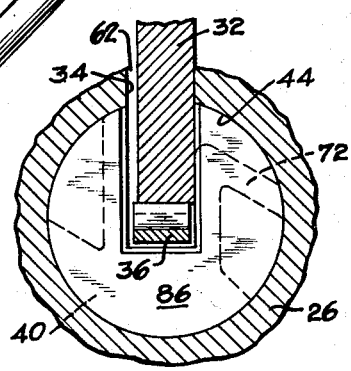
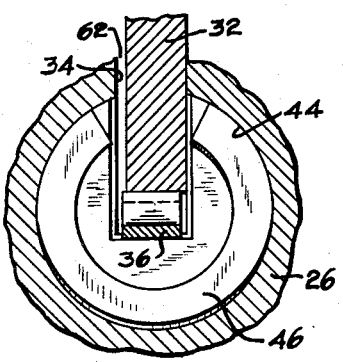
INVENTOR.
MAX BENTELE
BY
Thomas W. Kennedy
ATTORNEY INVENTOR.
MAX BENTELE
BY
Thomas W. Kennedy
ATTORNEY

United States Patent Office 3,180,562
Patented Apr. 27, 1965

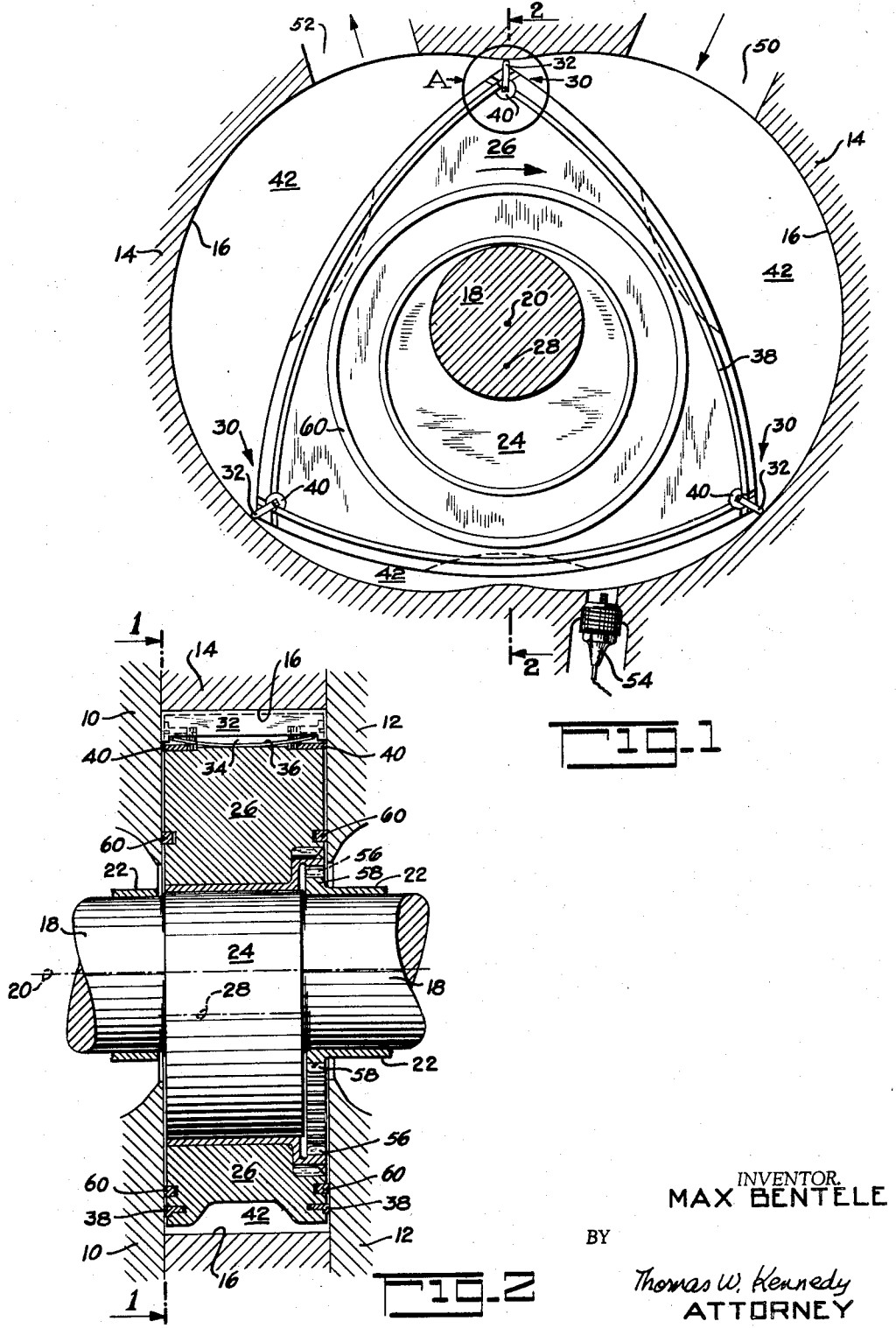

3,180,562
SEALS FOR ROTARY MECHANISMS
Max Bentele, Ridgewood, N.J., assignor to Curtiss-Wright Corporation, a corporation of Delaware
Filed Oct. 29, 1962, Ser. No. 233,657
5 Claims. (Cl. 230—145)

The present invention relates broadly to the art of rotary mechanisms and is particularly directed to sealing means for such rotary mechanisms.

The invention is particularly useful in connection with rotary mechanisms similar to that disclosed in United States Patent Number 2,988,065, although as will become apparent, this invention is not limited to this specific type of rotary mechanism. In the following description the invention is described in relation to an internal combustion engine, but the invention is also suitable for fluid pumps and fluid motors.

A rotary engine as disclosed in said patent comprises an outer body or housing having a cavity therein and an inner body or rotor disposed therein rotatable relative to the outer body, about an axis laterally spaced from, but parallel to this axis of said cavity. The inner body is journaled on an eccentric portion of a shaft which is coaxial with the outer body and journaled in bearings carried by the outer body end walls. The outer body has axially-spaced end walls and a peripheral wall interconnecting the end walls to form said cavity; the inner surface of the cavity peripheral wall having a multi-lobed profile which preferably is basically an epitrochoid.

The inner body or rotor has end faces carrying endface seal means and intermediate seal elements, disposed adjacent to said outer body end walls for sealing cooperation therewith, and has a peripheral surface with a plurality of circumferentially-spaced apex portions, each carrying a radially-movable seal or seal means for sealing engagement with the multi-lobed inner surface of the outer body peripheral wall to form a plurality of working chambers between the two bodies which vary in volume upon relative rotation of the two bodies. Each apex seal of the inner body is received within an outwardly-facing groove running axially from one end face to the other of the inner body at its associated apex portion on the inner body thereby separating the adjacent working chambers. The bottom of each apex groove has an enlarged cylindrical portion at each end of the groove, and an axially-movable intermediate seal element is slideably fitted within such cylindrical portion and urged axially against the end wall.

In prior rotary combustion engines of the aforementioned type, in one form of intermediate seal element, as illustrated in United States Patent Number 3,033,180 each end of each apex seal means is in sealing cooperation with seal faces of an intermediate seal element. Also, on each end face of the rotor adjacent to the rotor periphery are end face seal strips, each of which extends from sealing engagement with one intermediate seal element to an adjacent intermediate seal element, so that each intermediate seal element has seal faces in sealing engagement with an end of its associated apex seal means and with each end of each of its adjacent end-face seal means. For efficient operation, the engine working chambers must be sealed effectively, and there must be good sealing engagement between each intermediate seal member or element and its adjacent apex and end face seal means.

An object of the present invention comprises the provision of a rotary combustion engine in which a novel and simple intermediate seal member is provided at each end of each apex seal means to prevent leakage and to provide good sealing engagement with its adjacent apex and end face seals, and in which the intermediate seal member is interchangeable with other like intermediate seal members in the same or another like rotor.

In the past, the seal faces of an intermediate seal member were machine-cut simultaneously with the adjacent seal grooves while the intermediate seal member was secured in position on the rotor. This prior procedure provides perfect alignment between the intermediate seal member and its adjacent apex and end face seals, but since each intermediate seal element is machined in position it cannot be used interchangeably at other positions on the rotor or on other rotors. This invention provides an interchangeable intermediate seal member that has yieldable wall portions which can be formed and shaped to line up with the seal grooves to provide a good sealing fit of its seal faces with the apex and end-face seals substantially equal to that previously provided by machining.

Another object of the invention is to provide an intermediate seal member which has a yieldable portion in sealing engagement with an adjacent overlapping endface seal on one side, and on its other side has a portion in sealing engagement with an adjacent abutting end-face seal.

A further object of the invention is to provide an intermediate seal member having a radial slot with yieldable slot side walls, which can be alined with the walls of its adjacent apex seal groove, so that the apex seal strip can sealingly bear along its side against a flush surface formed by a wall of the apex groove and a wall of the radial slot.

An additional object of the invention is to provide a rotor with intermediate seal members, each of which can be replaced when required by a blank or standard intermediate seal member, which will have perfect sealing fit with its particular adjacent apex and end-face seals after being formed in place by an installing tool so that interchangeability as facilitated.

A further object of the invention is to provide a rotor with intermediate seal members in which one of its intermediate seal members can be replaced when worn out or damaged without the need to also replace all of its seal members, and remachine all of the rotor apex and endface grooves.

A still further object of the invention is to provide a rotor with intermediate seal members, which can be replaced without the need of removing the rotor form its housing, so that maintenance is simplified.

Still another object is to provide a lightweight intermediate seal member which can sealingly engage the outerbody end wall without interruption during any irregular rotor motion.

Other objects of the invention will become apparent upon reading the annexed detail description in connection with the drawings in which:

FIG. 1 is a diagrammatic transverse view of a rotary engine embodying the invention, showing an end view of the rotor and its seals;

FIG. 2 is a sectional view taken along line 2—2 of FIG. 1, showing a transverse view of the rotor and its seals;

FIG. 3 is an enlarged view of the circled portion A of FIG. 1;

FIG. 4 is a sectional view taken along line 4—4 of FIG. 3;

FIG. 5 is a perspective view of the intermediate seal member only, illustrated in FIG. 3 and FIG. 4;

FIG. 6 is a sectional view taken along line 6—6 of FIG. 4;

FIG. 7 is a sectional view taken along line 7—7 of FIG. 4;

Figure 8:
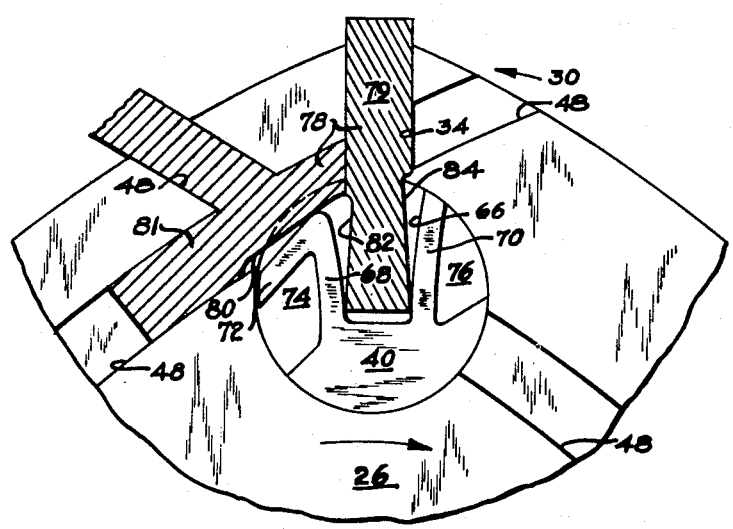
FIG. 8 is a view similar to FIG. 3 except showing the outer body and the apex and end-face seals deleted prior to assembly, and showing an installing tool fitted in the rotor grooves.

Referring to the drawings, the housing or outer body of a rotary mechanism comprises spaced end walls 10 and 12, and a peripheral wall 14 disposed between and interconnecting said end walls to form a cavity therebetween. The inner surface 16 of the peripheral wall 14 preferably has a multi-lobed profile in cross-section which preferably is basically an epitrochoid. A shaft 18, having an axis 20, which is co-axial with the axis of the outer-body cavity and along which the end walls 10 and 12 are spaced, extends through the outer body and is journaled in bearings 22 carried by the end walls 10 and 12. The shaft 18 has an eccentric portion 24 in which an inner body or rotor 26 is journaled, the axis of the inner body 26 and the eccentric 24 being indicated at 28. Inside and eccentric to the housing is disposed an inner body or rotor 26, having a plurality of circumferentially-spaced apex portions 30 about its outer periphery. Each of said apex portions 30 has radially-movable apex seal means 32 received within a single outwardly-facing apex groove 34 extending in a direction parallel to the rotor axis from one end face to the other of the rotor 26 and urged radially outward by spring means 36 into sealing engagement with the peripheral wall inner surface 16.

The inner body 26 also has end faces having end-face seal means 38 and intermediate seal members 40 disposed in sealing engagement with the end walls 10 and 12 which cooperate with the apex seals 32. The outer body and inner body 26 together with the seals 32, 38, 40 form a plurality of working chambers 42 which vary in volume upon rotation of the inner body 26 relative to the stationary outer body. The bottom of each apex groove 34 has an enlarged cylindrical bore portion 44 at each end of the groove, and an axially-movable intermediate seal member 40 is slidably fitted within such cylindrical portion and urged axially against the adjacent end wall 10 or 12 preferably by spring means 46 and gas pressure. Each end of each apex seal means 32 is in sealing cooperation with an intermediate seal member 40. Between the intermediate seal members 40, disposed at the rotor apex portions 30 on each end face of the rotor 26 adjacent to the rotor periphery, and associated with a working chamber 42, are end-face seal strips 38, each of which is received in a groove 48 in its rotor end face and extends from one intermediate seal member 40 to an adjacent member 40. Suitable spring means (not shown) may be provided behind each end-face seal 38 for helping to urge the seal strip against the adjacent end walls 10 and 12. During rotation of the inner body 26, the apex seal means 32 slide continuously along with their outer contact tips in bearing against the inner surface 16 of the peripheral wall 14, and the intermediate seal members 40 and end-face seal strips 38 slide continuously along the flat inner surfaces of the end walls 10 and 12.

The outer body has intake port means 50 for supply of an intake charge to the working chambers 42 and has exhaust port means 52 for discharge of exhaust gases from the engine. If needed, a suitable spark plug 54 may be provided to ignite the intake charge. In order to maintain the relative motion of the inner body 26 relative to the stationary outer body an internal gear 56 is, as illustrated, secured to the inner body co-axially with the inner body axis 28 and is disposed in mesh with a fixed gear 58 secured to the outer body co-axial with the outer body axis 20.

The seal strips 38 and intermediate seal members 40 at each rotor end face cooperate to provide a continuous contact area in sealing engagement with the adjacent end wall 10 or 12 of the outer body, said seal contact area encircling the rotor axis 28 and being disposed adjacent to the rotor periphery whereby a seal is provided adjacent to the rotor periphery against inward flow of combustion gases between the rotor end faces and the end walls 10 and 12.

In addition, a seal ring 60 is disposed in a circular groove in each end face of the rotor 26 radially outwardly of the journal bearing 22 for said rotor on the shaft eccentric 24 and radially inwardly of the end-face seal strips 38. The seal rings 60 function as oil seals to prevent leakage of lubricating oil radially outwardly beyond said seal rings 60 between their associated rotor end faces and outer body end walls. Suitable spring means (not shown) may be provided behind each oil seal 60.

The pressure differential between each two adjacent working chambers 42 urges the apex seal strip 32 therebetween laterally toward one side face or the other of its groove 34 for sealing engagement therewith thereby leaving a slight clearance 62 (FIG. 3) at the other side face of said groove. As a result, gas pressure from the adjacent working chamber is transmitted through said clearance 62 into the bottom of the associated groove 34 whereby said pressure adds to the force of the spring 46 urging the two intermediate seal members 40 at the ends of said groove axially into sealing engagement with the end walls 10 and 12 of the outer body and also adds to the force of the spring 36 urging said apex seal strip 32 radially outwardly.

Normally, under compression, combustion and expansion, the gas pressure within the working chambers 42 urges each end-face seal strip 38 radially inwardly against the radially inner face of its groove 48 as well as against the outer surfaces of the intermediate seal member 40 where the end-face seal 38 overlaps the intermediate seal member 40. The gas pressure also acts behind each end-face seal strip 38 to add to the pressure of the spring (not shown) against said end-face seal strip.

As illustrated, the end-face seal strip 38 on the leading side of an intermediate seal member 40 is in abutting engagement with said member 40 while the other end-face seal strip 38 engaging said member 40 is in overlapping engagement therewith. With this construction, the friction drag of the end wall 10 or 12 against its adjacent rotor end-face seals 38 urges the seals longitudinally along their grooves 48, so that the trailing or abutting end of each end-face seal 38 abuts against its adjacent intermediate seal member 40 while the leading or overlapping end of each end-face seal 38 slides slightly along the outer surface of its adjacent intermediate seal member 40, so that both ends of the end-face seals 38 remain in good sealing engagement with the intermediate seal members 40, and there is no leakage due to the friction drag. In addition, this arrangement also allows for differential thermal expansion between the end-face seals 38 and the rotor 26 without affecting gas sealing.

At the overlapping end of each end-face seal 38, the radially inner face of its groove 48 must form a smooth continuation of the outer seal face 64 of the adjacent intermediate seal member 40 in order to provide a good fit of the end-face seal 38 against said seal face 64 of the intermediate seal member 40.

In addition, the intermediate seal member 40 has a radial slot and to prevent gas leakage, the side walls of the radial slot 66 of the intermediate seal member 40 must be alined with the side walls of the rotor apex groove 34.

The engine so far described is substantially similar to the engine disclosed in the aforementioned United States Patent Number 2,988,065 and for additional description reference is made to said patent. The seal arrangement so far described is substantially similar to the seal arrangement disclosed in the aforementioned United States Patent Number 3,033,180 and reference is made to said patent. Also, although the rotary mechanism has been described as a rotary combustion engine it will be obvious that the invention is equally applicable to other forms of rotary mechanisms such as fluid motors or pumps.

In the prior construction of the intermediate seal members 40 its radial slot 66 and seal face 64 was machined with the seal member 40 secured in position in its rotor 26. With this prior construction a cylindrical pin was locked in position in a cylindrical bore 44 at a rotor end face and then the associated apex seal groove 34 and the end-face groove 48 on the trailing side of the pin was machined in the rotor and pin whereby each intermediate seal member was accurately machined in place and therefore was not interchangeable with other intermediate seal members.

With the present invention the grooves 34 and 48 and cylindrical bores 44 are machined in the rotor prior to installation of the intermediate seal members 40 in said bores. Each intermediate seal member 40 has a cylindrical outer profile to fit within a cylindrical bore 44 and has a radial slot 66 for alinement with the associated apex groove 34. In order to permit accurate alinement of the radial slot 66 in each intermediate seal member 40 with the apex seal groove 34 the walls 68 and 70 forming said slot 66 are made laterally yieldable. Likewise, the seal face 64, on each intermediate seal member is formed on a flange 72 which is radially yieldable for alinement with and to form a smooth continuation of the radially inner wall of the adjacent end-face groove 48. To provide this yieldable construction each intermediate seal member 40 has a recessed portion 74 on one side to form the yieldable flange 72 and a recessed portion 76 on the other side so that the two recessed portions 74 and 76 together form laterally yieldable walls 68 and 70 for its radial slot 66. The recessed portions 74 and 76 preferably run the entire length of each intermediate seal member 40.

After installation in a cylindrical bore 44 each intermediate seal member 40 is deformed to provide the alinement of its radial slot 66 with the adjacent apex groove 34 and then the alinement of its seal face 64 with the inner wall of the adjacent end-face groove 48. For this purpose a suitable installing tool 78 composed of two pieces 79 and 81 is inserted in the rotor grooves 34 and 48 as illustrated in FIG. 8. First, pressure is applied laterally inwardly against the walls 68 and 70 of the radial slot 66 to deform said walls against the tool faces 82 and 84. These latter tool faces 82 and 84 are undercut slightly to allow for some spring back of the walls 68 and 70 when said pressure is removed, so that after this pressure is removed the inner wall surfaces of the radial slot 66 are in alinement with the wall surface of the asscociated apex groove 34. Then, pressure is applied radially outward against the flange 72 to deform it against the tool face 80. This tool face 80 is undercut slightly from the adjacent inner wall of the end-face groove 48 to allow for some spring back of the flange 72 when said pressure is removed, such that after said pressure is removed the outer seal face 64 of the flange 72 is in alinement with and forms a smooth continuation of the inner wall of the adjacent end-face groove 48. FIG. 8 illustrates an intermediate seal member 40, as fabricated, but before deformation to the desired shape within a particular bore 44 in a rotor 26. The magnitude of the deformation required of the flange 72 and walls 68 and 70 for obtaining the desired alinement, and the magnitude of the undercut of the tool faces 80, 82, and 84 have been greatly exaggerated in FIG. 8 for purposes of illustration.

Accordingly, when an intermediate seal member 40 is installed and formed as described, the side walls 68 and 70 of its radial slot 66 will be in alinement with the side walls of its associated apex groove 34 whereby the associated apex seal 32 can be flush against its groove side walls. Similarly, its seal face 64 will be in alinement with the inner wall of the adjacent end face seal groove 48 for good overlapping sealing engagement with the end-face seal 38. In addition, an intermediate seal member 40 can readily be replaced without any machining operation, and by means of the tool 78 can be installed in any position on a rotor 26 or in any rotor having similar bores 44 for intermediate seal members 40.

A seal element 86 as illustrated in FIG. 6, is disposed in the bottom of each bore 44 and has a face in sealing engagement with the inner end face of the intermediate seal member 40. Gas pressure in the apex groove 34 adjacent to and under the associated apex seal means 32 and spring means 46 as illustrated in FIG. 7, urges the seal element 86 in bearing and sealing engagement against the intermediate seal member 40. Gas is thereby prevented from escaping out of a chamber 42 and into another chamber 42 by the seal element 86, of which seals the recessed portions 74 and 76 at the inner end of the intermediate seal member 40.

Figure 9:
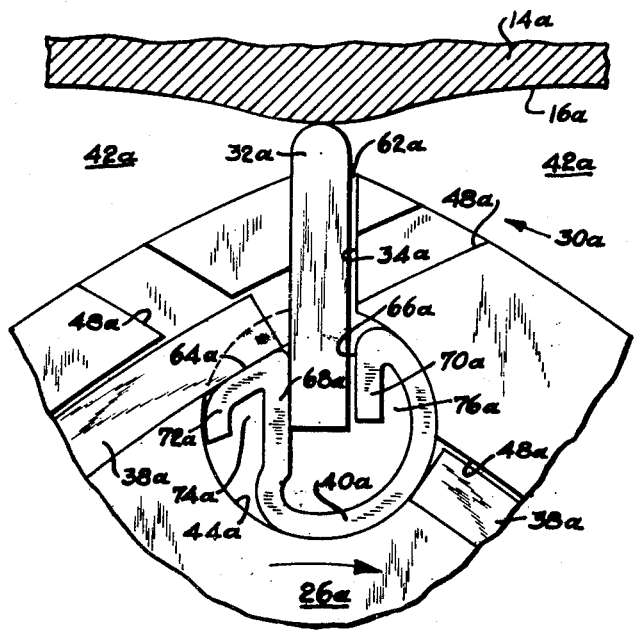
FIG. 9 is a view similar to FIG. 3 except showing another form of intermediate seal member in accordance with the invention.
Figure 10:
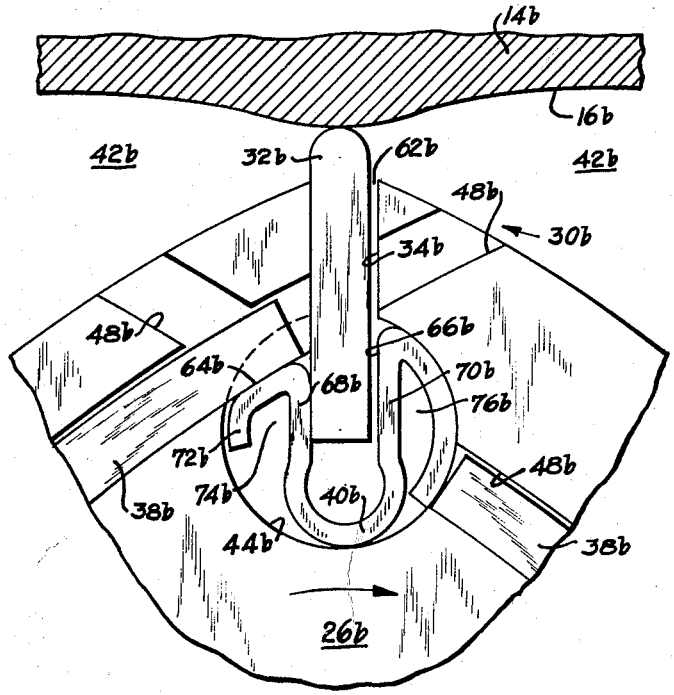
FIG. 10 is another view similar to FIG. 9, illustrating still another form of intermediate seal member.

In the embodiment described each intermediate seal member 40 can be fabricated from a casting or forging or extrusion. Such intermediate seal member can be also rolled from suitable sheet metal material. Two forms of sheet metal construction are illustrated in FIGS. 9 and 10. For ease of understanding the parts of FIGS. 9 and 10 corresponding to parts of FIG. 3 have been designated by similar reference numerals but with subscripts *a* and *b* respectively added thereto. Obviously, the flanges 72*a* and 72*b* and the walls 68*a*, 70*a* and 68*b*, 70*b* of the radial slots 66*a* and 66*b* of the intermediate seal members 40*a* and 40*b* are yieldable as described for the seal member 40 and therefore can be similarly installed, and are interchangeable therewith. Accordingly, no further description of FIGS. 9 and 10 appears necessary.

The various improvements of the invention provide good sealing during engine operation, reduce the manufacturing cost of the intermediate seal members, provide for interchangeability of the intermediate seal members, facilitate replacement of intermediate seal members and increase the life of the engine.

While I have described my invention in detail in its present preferred embodiment it will be obvious to those skilled in the art after understanding my invention that various changes and modifications may be made therein without departing from the principle or scope thereof. It is intended by the appended claims to cover all such modifications.

What is claimed is:

1. In a rotary mechanism having an outer body with spaced end walls and a peripheral wall interconnecting said end walls and forming a cavity therebetween, said outer body having a longitudinal axis along which said end walls are spaced, said peripheral wall having an inner surface of basically epitrochoidal profile, and an inner body disposed within said cavity for rotation relative to said outer body, said inner body having an axis displaced from but parallel to said outer body axis, said inner body being rotatable about said inner body axis, said inner body having a plurality of circumferentially-spaced apex portions in sealing relation with said inner surface and having parallel end faces in sealing relation with said end walls, said inner and outer bodies forming on relative rotation a plurality of variable-volume working chambers therebetween; the combination of a chamber-sealing system with said inner body comprising: said inner body having at each apex portion an outwardly opening apex groove having generally radial parallel side walls and extending from one of said end faces to the other, said inner body having at each apex portion a cylindrical bore in each end face, the inner end of each of said bores communicating with the adjacent apex groove, each of said end faces having a plurality of end-face grooves therein adjacent to the periphery thereof, there being on each end face one of said end-face grooves extending between each pair of adjacent apex portions, each of said end-face grooves having one end communicating with one of said bores approximately normal thereto at the leading side of said bore in the direction of inner body rotation and the opposite end communicating with another bore generally tangential thereto at the trailing side of said bore in the direction of inner body rotation, an apex seal strip disposed in each of said apex grooves and extending between said end walls, each of said apex seals having its radially inner edge positioned within its associated groove and its radially outward edge protruding slightly therefrom and sweeping said inner surface in sealing relation thereto, an intermediate sealing member disposed in each of said bores, each of said intermediate members having a relatively thin-walled portion defining a groove which is positioned continuous with the communicating apex groove and engages the radially inner portion of the associated apex seal at the end thereof, each of said intermediate members having a portion of its surface of cylindrical contour positioned facing the approximately normally communicating end of one of said end-face grooves, each of said intermediate members having a flange portion extending from one of its thin-sectioned groove walls in a generally tangential direction away from its groove and in line with the generally tangentially communicating end of the other of said end-face grooves, and a plurality of end-face seal strips disposed one in each of said end-face grooves, each of said end-face seal strips having one end abutting said cylindrical portion of an intermediate member in sealing relation thereto and the other end overlying said flange portion of another intermediate member in sealing relation thereto, said end-face seal strips and the axially outer ends of said intermediate members sweeping said end walls in sealing relation thereto, said apex seals and intermediate members and end-face seals comprising a combination with said inner body to seal said plurality of working chambers.

2. The combination recited in claim 1, wherein each of said bores has resilient means disposed therein axially inwardly of said intermediate members urging said intermediate members in the axially outward direction against said end walls, each of said end-face grooves has resilient means disposed therein axially inwardly of said end-face seals urging said end-face seals in the axially outward direction against said end walls, and each of said inner body apex grooves has resilient means disposed therein radially inwardly of said apex seals urging said apex seals in the radially outward direction against said inner surface.

3. The combination recited in claim 2, wherein each of said bores has a disk-like sealing member disposed therein between said intermediate member and said resilient means.

4. An intermediate seal member having a generally cylindrical outer profile for use within a cylindrical bore in an end face of the inner body of a rotary mechanism, said seal member having a pair of parallel thin-sectioned wall portions defining a radial slot running from one end of the member to the other, one of said walls having at the radially outer portion thereof a flange-like portion extending in the generally tangential direction away from said slot, said seal member having a surface portion of cylindrical contour on the side generally opposite said flange-like portion.

5. An intermediate seal member as recited in claim 4 and in which the member is formed of metallic sheet material.

References Cited by the Examiner
UNITED STATES PATENTS

| | | | |
|---|---|---|---|
| 816,784 | 4/06 | Dahl | 91—124 |
| 862,620 | 8/07 | Egersdorfer | 91—124 |
| 1,012,440 | 12/11 | Reichhelm | 230—157 |
| 1,370,810 | 3/21 | Hansen | 103—135 |
| 1,720,577 | 7/29 | Stern | 103—144 |
| 3,043,231 | 7/62 | Bodycomb | 103—144 |
| 3,127,096 | 3/64 | Froede | 230—145 |

FOREIGN PATENTS 484,669 10/29 Germany.
320,398 10/29 Great Britain.

LAURENCE V. EFNER, *Primary Examiner.*
WILBUR J. GOODLIN, *Examiner.*